Jan. 27, 1942.　　J. M. HARTGERING ET AL　　2,270,843
ROTARY COUNTERBALANCE
Filed July 19, 1939
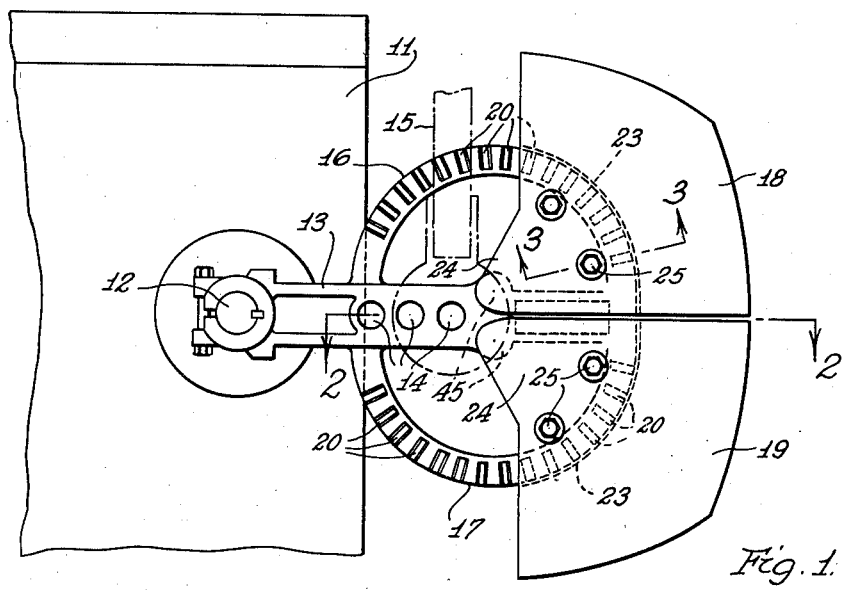
INVENTORS
JOHN M. HARTGERING
CHARLES M. PERKINS
BY
Joseph Farley
ATTORNEY.

Patented Jan. 27, 1942

2,270,843

UNITED STATES PATENT OFFICE 2,270,843

ROTARY COUNTERBALANCE

John M. Hartgering and Charles M. Perkins, Detroit, Mich., assignors to Palmer-Bee Company, Detroit, Mich., a corporation of Michigan Application July 19, 1939, Serial No. 285,374

12 Claims. (Cl. 74—591)

This invention relates to rotary type counterbalances such as are used with oil well pumping units, where they are connected directly to the output or crank shaft of the driving mechanism, either superseding or supplementing the use of the reciprocating counterbalance on the walking beam.

With the use of a rotary counterbalance it becomes possible to change the angular position of the counterbalance in relation to the center of rotation of the crank, thus varying the magnitude, and to some extent, the phase of the counterbalance torque so that the load torque can be counteracted to a maximum extent for varying conditions in the operation of the well.

The principal object of this invention, therefore, is to provide a means for mounting the counterweights so that their angular position may be adjusted.

Another object is to associate the constituent parts of the construction in such a way that the adjustment of the counterweights may be made without removing them from their supporting ring.

A further object is to have the weight of the counterbalance and the strain caused thereby evenly distributed over the supporting ring and associated parts.

Representative embodiments of the invention are shown in the accompanying drawing, where:

Fig. 1 is a side elevation showing a portion of the gearbox of a pumping unit, the output shaft thereof, the crank, the counterweights, and in dotted lines, a portion of the pitman.

Fig. 2 is a section on an enlarged scale taken along the line 2—2 of Fig. 1, showing the counterweights, their supporting rings, and a portion of the crank.

Fig. 3 is a further enlarged section taken along the line 3—3 of Fig. 1 showing the means by which the counterweights are held in position.

Fig. 4 is taken along the line 4—4 of Fig. 3 showing additional details.

Fig. 5 shows an alternate form of construction, it being a section showing the counterweights and a portion of the supporting rings.

In Fig. 1, 11 represents a portion of a gear box or reducer having an output shaft 12 to which a crank 13 is keyed. This crank has a number of wrist pin bearing holes 14, to any one of which the pitman 15 is connected with a taper fit to insure easy assembly and disassembly of the pitman in case it becomes necessary to change the length of the pumping stroke or to service the well. A clamping ring, in two segments 16 and 17, is cast integral with the crank 13 to carry the counterweights, which are used in pairs, there being two counterweights 18 and 18' secured to the segment 16 of the clamping ring and two more, 19 and 19' secured to the segment 17. Each face of the segments 16 and 17 of the clamping ring is provided with a series of keyways 20 which are positioned substantially in radial relation to the center of the segments and which are formed by cores when the crank and clamping ring is cast. They require no machining if the foundry work is held to an average degree of accuracy. Each counterweight in this particular illustrative embodiment of the invention is constructed with two integrally cast keys 21 adapted to engage the keyways 20 of the clamping ring and which are spaced about five keyways apart.

Figs. 3 and 4 show details of this key and keyway construction and the manner in which the counterweights are attached to the clamping ring. The keyways 20 are of rectangular shape having their longitudinal sides 22 in V or angular relation to each other. While the keys 21 are similar in contour it is to be noted that the keyways are longer and narrower than the keys so that when the two are in engagement there is a fair amount of clearance at the ends and bottom of the key and keyway. All contact between the counterweights and the clamping ring is therefore confined to the inclined surfaces 22 of the keyways, because the recess 23 in the counterweights, into which the clamping ring fits, is formed so that there will be clearance between the counterweight and clamping ring at all points except where a key engages a keyway. By means of the bolts 25 the pairs of counterweights are clamped together bringing the keys into engagement with the keyways, and bringing the tail portions 24 into contact with the bosses 45 formed on the crank. Thus in this form, which is used for the larger sizes, there is essentially a three-point contact between each counterweight and the clamping ring and crank unit.

Fig. 5 shows another form of the invention used with a clamping ring 26 having an inner web portion 28 and counterweights 27 and 27' in which the tail portions 24 of the former design are lacking but have their functional counterpart in the bosses 36 at the outer portion of their inner faces and have their inner surface 29 conforming in contour to the inner surface 30 of the clamping ring. Keys 31 are cast as before within the recesses 32 of the counterweights and are held in engagement with keyways 33 in the clamping ring by the action of the bolts 37. The keys and keyways are similar to those previously described in respect to their dimensions and fabrication but their inclined sides 34 are substantially parallel to the circumference of the clamping ring where they were perpendicular thereto in the first design. Clearance is provided between the clamping ring 26 and the counterweight recesses 32 so that as before the only contact between the counterweights and clamping ring is on the inclined surfaces of the keys and keyways.

In the preferred form of the invention shown in Figs. 1 to 4 inclusive, the engagement of the inclined sides of the keys and keyways, while obviously preventing circumferential movement of the counterweights, also confines their radial movement both toward and away from the center of rotation. Since the keyways are radially located with reference to the center of the clamping ring, but are rectangular in form and are engaged by two spaced keyways on the counterweights, any tendency of the counterweights to move inwardly of their natural position will be opposed by the contact between the two outer inclined sides of the pair of engaged keys and keyways, for example, the sides 38 in Fig. 4; while any tendency for outward movement of the counterweights such as would be caused by centrifugal force will be prevented by the contact between the two inner sides of the pair of engaged keys and keyways, such as the sides 39 in the same view. Because of this form of key and keyway action, the keyways 20 may be made open ended toward the outer circumference of the clamping ring, which construction facilitates the process of moving the counterweights from one position to another.

All forms of counterweights are such that when it is desired to change their position on the periphery of the clamping ring, the bolts are merely loosened, not removed, until the keys become disengaged from the keyways, at which point the inner shoulder 35 of both the recesses 32 and 23 will contact the inner circumferential surface of the clamping ring preventing the counterweights from coming off. This ability to adjust the counterweights without the necessity of removing them is a distinct advantage when it is considered that the weight involved is usually upwards of a ton for each pair of counterweights. Although some vertical movement of the counterweights is necessary when their angular position is changed with this form of construction, due to the small clearance provided between the inner circumference of the clamping ring and the adjacent shoulder of the counterweight, it is of such magnitude that it can be readily accomplished by the use of such a simple lifting device as a lever.

Since the parts involved in one of these units are very large castings and since it is desirable to hold their cost and therefore the amount of their machining to a minimum, the construction of the present invention is very advantageous because it makes it possible to satisfactorily assemble the parts with no previous machining, in spite of the considerable amount of surface unevenness that is bound to occur in large castings of this type. If the keys and keyways were eliminated and the counterweights were clamped directly to the clamping ring relying solely upon frictional contact to prevent their radial and circumferential movement, the unevenness of the surfaces would cause intense and non-uniformly distributed stresses to be set up in the clamping ring, an obviously unsatisfactory and dangerous condition. The keyed construction of the present invention, however, uniformly localizes these stresses along the inclined surfaces of the keys and keyways which can then be designed with a comfortable factor of safety. Moreover, a keyed engagement between counterweights and the clamping ring is better adapted to withstand the centrifugal forces developed which are of considerable magnitude owing to the great weight of the moving parts, although the speed at which the crank rotates is low, with less clamping force exerted by the bolts and therefore smaller induced stresses in the counterweights and in the clamping ring.

The constructions illustrated and described herein are merely illustrative examples of how the present invention may be embodied in the use of rotary type counterweights, and since many variations in form and detail design are possible in devices of this kind, it is understood that such may be made without departing from the spirit of this invention as defined in the following claims.

We claim:

1. In a driving unit having a crank connected to the output shaft thereof, means for securing rotary counterweights to said crank comprising a clamping ring formed therewith, radial keyways cast at spaced intervals in the ring portion of said clamping ring, keys cast in said counterweights to engage a plurality of said keyways and bolts connecting a pair of said counterweights to draw said keys into engagement with said keyways.

2. In a driving unit having a horizontal output shaft, a crank connected to said shaft, a clamping ring formed with said crank and adapted to support counterweights which are attached thereto in pairs, keyways formed at spaced intervals on the vertically extending outer faces of said clamping ring in substantially radial relation to the center thereof, said keyways formed with two of their opposite sides in angular relationship, said counterweights having a recessed portion conforming in contour to the outer part of said clamping ring, a plurality of keys formed on said counterweights within said recessed portion thereof, said keys having inclined sides adapted to engage the similar sides of said keyways, and bolts connecting a pair of counterweights to draw the inclined sides of said keys and keyways into engagement.

3. In a driving unit having a horizontal output shaft, a crank connected to said shaft, a clamping ring formed with said crank and adapted to support counterweights which are attached thereto in pairs, keyways formed at spaced intervals on the vertically extending outer faces of said clamping ring in substantially radial relation to the center thereof, said keyways formed with two of their opposite sides in angular relationship, said counterweights having a recessed portion conforming in contour to the outer part of said clamping ring, a plurality of keys formed on said counterweights within said recessed portion thereof, said keys having inclined sides adapted to engage the similar sides of said keyways, and bolts connecting a pair of counterweights about said clamping ring, said counterweights being held thereon by the engagement of the inclined sides of said keys and keyways when said bolts are tightened and by the engagement of the inner side of said recessed portion of said counterweights with said clamping ring when said bolts are loosened.

4. A combined crank and clamping ring for use on the output shaft of a driving unit with a rotary type counterbalance, characterized by a series of equally spaced keyways formed around both sides of the ring portion of said clamping ring, said counterbalance being composed of counterweights mounted in pairs upon said clamping ring, spaced keys cast in said counterweights adapted to engage said keyways of said clamping ring, and bolts connecting said paired counterweights.

5. A combined crank and clamping ring for use on the output shaft of a driving unit with a rotary type counterbalance, characterized by a series of equally spaced keyways formed around both sides of the ring portion of said clamping ring, said counterbalance being composed of counterweights mounted in pairs upon said clamping ring, spaced keys cast in said counterweights adapted to engage said keyways of said clamping ring along common angular surfaces and bolts sonnecting said paired counterweights.

6. A combined crank and clamping ring for use on the output shaft of a driving unit with a rotary type counterbalance, characterized by a series of equally spaced keyways formed around both sides of the ring portion of said clamping ring, said counterbalance being composed of counterweights mounted in pairs upon said clamping ring, spaced keys cast in said counterweights adapted to engage said keyways of said clamping ring along common angular surfaces the sole contact between said counterweights and clamping ring being along said common angular surfaces.

7. In a rotary counterbalance device composed of a crank, a clamping ring attached to said crank and counterweights adapted to be mounted upon said clamping ring, means whereby said counterweights can be securely held against radial and circumferential movement to said clamping ring at selected positions along the periphery thereof, comprising radial keyways cast at spaced intervals in the ring portion of said clamping ring, keys cast in said counterweights to engage a plurality of said keyways, bolts connecting a pair of said counterweights to draw said keys into engagement with said keyways, and means, independent of said aforementioned means, whereby said counterweights will be affixed to said clamping ring while being moved to some other selected position on the periphery thereof.

8. In a driving unit having a horizontal output shaft, a crank connected to said shaft, a clamping ring formed with said crank and adapted to support counterweights which are attached thereto in pairs, keyways formed at spaced intervals on the vertically extending outer faces of said clamping ring in substantially radial relation to the center thereof, said keyways formed with two of their opposite sides in angular relationship, said counterweights having a recessed portion conforming in contour to the outer part of said clamping ring, a plurality of keys formed on said counterweights within said recessed portion thereof, said keys having inclined sides adapted to engage the similar sides of said keyways all contact between said counterweights and clamping ring being confined to said inclined sides of said keys and keyways, and bolts connecting a pair of counterweights to draw the inclined sides of said keys and keyways into engagement.

9. In a driving unit having a horizontal output shaft, a crank connected to said shaft, a clamping ring formed with said crank and adapted to support counterweights which are attached thereto in pairs, keyways formed at spaced intervals on the vertically extending outer faces of said clamping ring in substantially radial relation to the center thereof, said keyways formed with two of their opposite sides in angular relationship, said counterweights having a recessed portion conforming in contour to the outer part of said clamping ring, a plurality of keys formed on said counterweights within said recessed portion thereof, said keys having inclined sides adapted to engage the similar sides of said keyways, and bolts connecting a pair of counterweights about said clamping ring, all contact between said counterweights and clamping ring being confined to the said inclined sides of said keys and keyways when said bolts are tightened.

10. In a driving unit having a horizontal output shaft, a crank connected to said shaft, a clamping ring having an outer and inner rim integrally formed with said crank, keyways provided at spaced intervals on the vertically extending outer faces of said clamping ring between the said outer and inner rim thereof in substantially radial relation to the center thereof, said keyways formed with a pair of their opposite sides in angular relationship, counterweights adapted to be secured in pairs to said clamping ring, said counterweights having a recessed portion conforming in contour to the outer part of said clamping ring between said outer and inner rims, the inner shoulder of said recess lying adjacent to the inner rim of said clamping ring, keys formed on said counterweights within said recessed portion thereof, said keys having inclined sides adapted to engage the similar sides of said keyways, and bolts connecting a pair of said counterweights about said clamping ring, all contact between said counterweights and clamping ring being confined to the said inclined sides of said keys and keyways when said bolts are tightened, contact between said counterweights and clamping ring being primarily between the said inner shoulders of the said counterweight recesses and the inner rim of said clamping ring when said bolts are loosened.

11. In a driving unit having a crank connected to the output shaft thereof, means for securing rotary counterweights to said crank comprising a clamping ring formed therewith, keyways cast at spaced intervals in the ring portion of said clamping ring, bosses formed on said crank adjacent the hub portion of said clamping ring, keys formed in said counterweights to engage a plurality of said keyways, tailpieces formed with said counterweights to abut against said bosses, and means whereby a pair of said counterweights can be brought together about said clamping ring bringing said keys and keyways and said tailpieces and bosses into firm contact.

12. In a rotary counterbalance device composed of a crank, a clamping ring attached to said crank, and counterweights adapted to be mounted upon said clamping ring, means whereby said counterweights can be securely held against radial and circumferential movement to said clamping ring at selected positions along the periphery thereof, comprising keyways formed at spaced intervals in the ring portion of said clamping ring, the sides of said keyways parallel to the periphery of said clamping ring being inclined, correspondingly formed keys being provided on said counterweights, means whereby said keys are held in engagement with said keyways, and means, independent of said first-mentioned means, whereby said counterweights will be affixed to said clamping ring while being moved to some other selected position on the periphery thereof, said means comprising annular shoulders formed on the inner periphery of said clamping ring, said shoulders lying within recesses formed on the inner faces of said counterweights when said counterweights are mounted upon said clamping ring.

JOHN M. HARTGERING.
CHARLES M. PERKINS.